Patented July 31, 1951

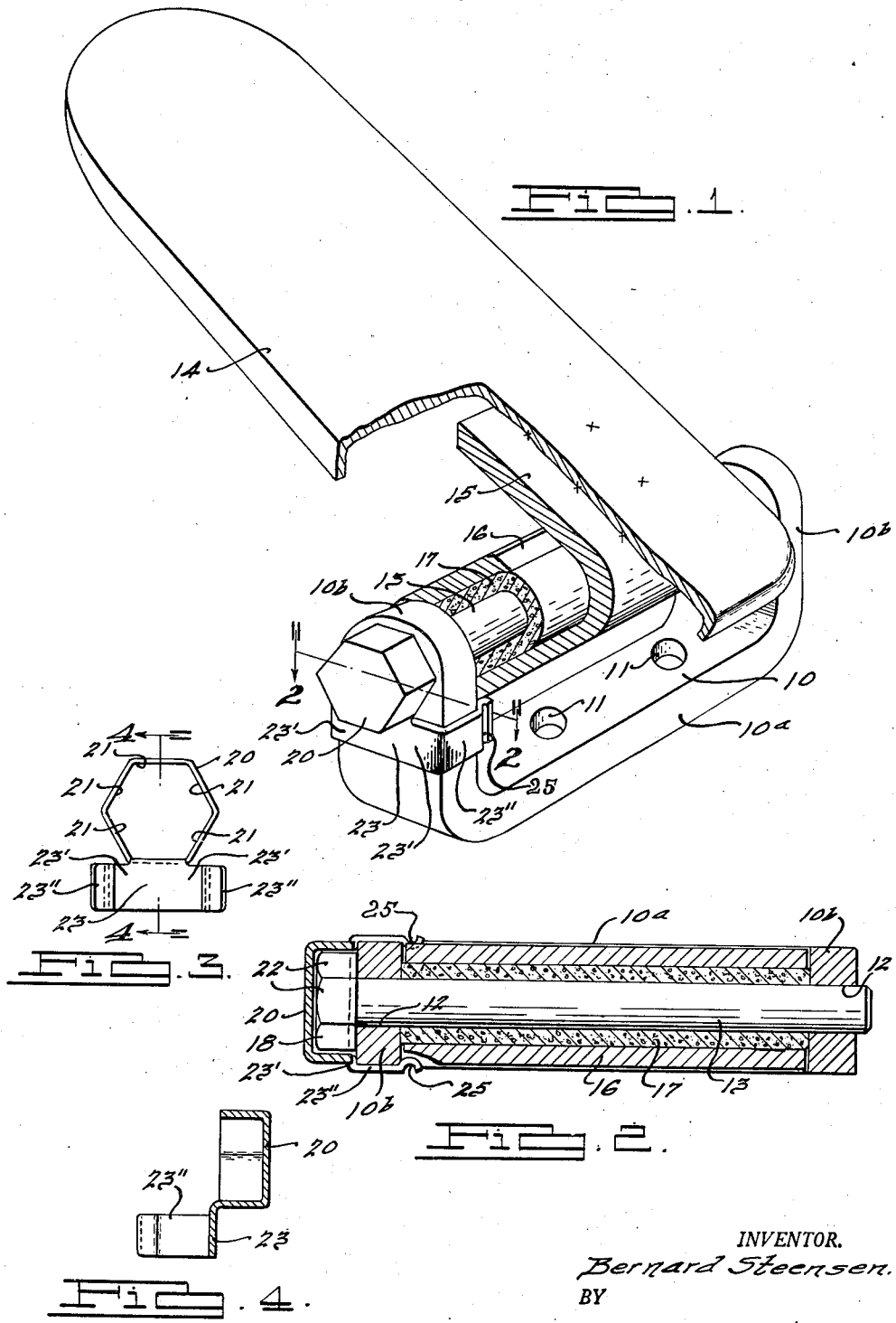

2,562,649

UNITED STATES PATENT OFFICE 2,562,649

PIN RETAINER

Bernard Steensen, Detroit, Mich., assignor to Chrysler Corporation, Highland Park, Mich., a corporation of Delaware Application May 9, 1946, Serial No. 668,552

9 Claims. (Cl. 16—169)

My invention relates to retaining means for bolts or pins.

It is an object of my invention to provide a clip which may be readily assembled with a bolt or pin to hold it in its predetermined position relative to a cooperating member without the use of threads, cotter pins, nuts, washers, and the like. The clip is economical to manufacture and facilitates rapid assembly work. It may be used with a hinge pin that requires a minimum of manufacturing operation in its fabrication. A straight shaft and irregular head are the only requirements. Heretofore, it has been necessary to incorporate holes, slots, threads or expensive machining elements as a component of the fastening means. In addition, the clip may be so formed as to present a smooth exterior surface.

It is common practice for a pin or bolt retained by a first member to form the journal upon which a second member having a bearing is mounted for relative rotation between the members. Hinges are an example of constructions of this nature. It is often desirable to prevent the hinge pin from rotating relative to one of the members. My invention is adapted to retain the hinge pin against rotation relative to one of the hinge members within the limits of the relative movement of the members. My description herein illustrates an automobile accelerator pedal hinge in which it is desirable to have the pin remain stationary relative to the vehicle floor bracket so that a relatively large bearing surface of self-lubricating material may be provided on the pedal and relatively small areas of contact between the bracket and pin may be provided because of the assurance that there will be no rotation therebetween.

I have provided a clip which will perform the desired functions which has the additional advantage of being positioned at one end of the hinge assembly. There are no cumbersome crossover elements to reach the opposite end of the hinge assembly required as component parts of my clip.

My invention is not intended to be limited to accelerator pedal hinges but it will be described in relation thereto as a typical application of my invention.

In the drawings:

Fig. 1 is a perspective view of an automobile accelerator pedal, floor bracket and hinge pin assembly with a portion thereof broken away to show interior construction.

Fig. 2 is a section on the line 2—2 of Fig. 1;

Fig. 3 is an elevational view of the clip as viewed from the pin head contacting side thereof; and Fig. 4 is a section on the line 4—4 of Fig. 3.

Referring to the drawings, Fig. 1 shows a floor bracket 10 which may be fastened to the vehicle floor by any suitable means such as by screws (not shown) which penetrate openings 11 therein. The bracket 10 has a base portion 10ª and a pair of parallel vertical ears 10ᵇ thereon. A pair of aligned holes 12 are provided in ears 10ᵇ to receive an extended element or hinge pin 13. An accelerator pedal 14 adapted to be depressed by the vehicle driver's foot is disposed between ears 10ᵇ. A casing element 15 is welded or otherwise secured to pedal 14. Casing element 15 has a cylindrical portion 16 which encompasses a tubular bearing member 17. Bearing member 17 engages pin 13 and is preferably formed of some metal composition different from that of the pin 13. The bearing member 17 is preferably formed by molding and sintering powdered metal or metals of different melting points in a manner now well known in forming porous metal bearings of the self-lubricating type as, by way of example, set forth in the patents to C. A. Tea 1,927,619 of September 19, 1933 and to W. G. Calkins et al. 1,927,627 of September 19, 1933. Lubricant may be provided in the form of graphite included in the metal mixture supplemented by or substituted by fluid lubricant absorbed by immersing the bearing in lubricating oil then to be exuded to the bearing surface.

It is desirable that the pin 13 be held relative to bracket 10 so that motion of pedal 14 will be accommodated by rotation of bearing member 17 on pin 13 rather than having pin 13 rotate with pedal 14 and wear the relatively thin ears 10ᵇ which form a less desirable bearing surface at the holes 12. Means to accomplish this are provided in my novel clip and its cooperation with pin 13 and bracket 10.

Pin 13 is provided with a polygonal head 18. The drawings illustrate a pin head of hexagonal section. The engagement of head 18 with ear 10ᵇ prevents pin 13 from moving to the right in Fig. 2. My novel clip is provided with a concave pin head receiving portion 20 having surfaces 21 therein which engage corresponding pin head surfaces 22 to prevent rotation of the pin relative to the clip. A preferred form of the device is shown in which the concave pin head receiving portion 20 of my clip is hexagonal to cooperate with the hexagonal pin head 18. A pair of legs or clip members 23' are each adapted to snap over ear 10ᵇ and are offset below the axis of pin head receiving portion 20. The clip members 23' have a common central portion 23 joined to pin head receiving portion 20. The clip members 23' and their common portion 23 when assembled as shown in Fig. 1 are offset below the axis of pin 13 a sufficient distance so that cylindrical portion 16 of casing element 15 may extend substantially the full distance along pin 13 between ears 10ᵇ without incurring interference from members 23'. Clip members 23' are preferably formed of flat spring steel and have portions parallel to and in combination approximately the width of ear 10ᵇ and portions 23'' bent forwardly parallel to the axis of pin 13. Portions 23'' have shoulders 25 adapted to snap over the inner edge of ear 10ᵇ.

The clip through its engagement of shoulders 25 with ear 10ᵇ prevents pin 13 from moving to the left in Figs. 1 and 2. The clip also prevents pin 13 from rotating relative to bracket 10 throughout the range of operating movement of pedal 14. The positive connection of clip members 23' with bracket ear 10ᵇ combined with the hexagonal pin head and hexagonal pin head receiving portion 20, prevent the rotation.

Hinge pin 13 may be a relatively simple form of pin having a straight shaft and the head 18. The desired results described above are obtained by my clip without the necessity of providing cooperating holes, slots, threads, or the like in pin 13. The elimination of these elements makes the pin considerably more economical to manufacture.

The clip is completely assembled with the hinge elements at one end thereof. This facilitates assembly and installation.

I claim:

1. A hinge assembly comprising a first hinge member and a second hinge member, said members having aligned holes therein, a pin penetrating said holes and having a head thereon, a clip covering said head and having a snap on engagement with said first member in a region of close proximity to said head to retain said pin in said holes.

2. A hinge assembly comprising a first hinge member and a second hinge member having aligned holes therein, a pin having a head thereon, said pin being adapted to be inserted in said holes from one end of the hinge by axial movement in a first direction said head being operable to abut said first hinge member to limit the axial movement of said pin in said first direction and a clip having a first portion adapted to engage said head and another portion adapted to effect a snap on engagement with said first hinge member when said clip is installed on said one end by axial movement thereof in said first direction.

3. A hinge assembly comprising a fixed bracket having upturned ears adjacent each end thereof and having aligned holes therein, a pin engaging said holes and having a laterally extending element abutting one of said ears to prevent axial movement of said pin in one direction, a member positioned between said ears for rotation relative to said bracket, a bearing means engaging said pin throughout a substantial portion of the length of the pin between said ears, said bearing means being operatively connected to said member, and means engaging said laterally extending element and clipping to said bracket to prevent axial movement of said pin in a second direction and rotation thereof relative to said bracket within the limits of movement of said member.

4. A hinge assembly comprising a fixed bracket having upturned ears adjacent each end thereof and having aligned holes therein, a pin engaging said holes and having a laterally extending element abutting one of said ears to prevent axial movement of said pin in one direction, a member positioned between said ears for rotation relative to said bracket, a clip device engaging said laterally extending element and having a pair of flexible arms adapted to engage one of said ears to prevent movement of said element relative to said ear, said arms being offset to eliminate interference with said member.

5. A hinge assembly comprising a first hinge member having first and second spaced ears thereon and a second hinge member positioned between said ears, said ears and said second member having aligned holes therein, a pin having a head thereon abutting said first ear and a solid relatively smooth shank penetrating said aligned holes, a first means having a portion adapted to receive said head and including means providing a positive connection of said portion with said first ear operable to retain said members and said pin in assembled relationship.

6. A mechanism for pivotally mounting a vehicle accelerator pedal on the floor of a motor vehicle comprising a bracket secured to said floor and having spaced upstanding ears provided with aligned holes, a pin having a head thereon engaging one of said ears and a shaft penetrating said aligned holes, said pedal having a cylindrical element associated therewith which is located between said ears, said element circumscribing said shaft and a clip extending over said head and engaging said first ear to retain said pin in said holes.

7. A mechanism for pivotally mounting a vehicle accelerator pedal on the floor of a motor vehicle comprising a bracket secured to said floor and having spaced upstanding ears provided with aligned holes, a pin having a head thereon engaging a first one of said ears and a shaft penetrating said aligned holes, said pedal having a cylindrical element associated therewith which is located between said ears, said element circumscribing said shaft and a clip extending over said head and engaging said first ear to retain said pin in said holes, said head and said clip having cooperating surfaces operable to prevent relative rotation therebetween whereby rotation of said pin relative to said ears is prevented by said clip.

8. A hinge assembly comprising a first hinge member and a second hinge member, said members having aligned holes therein, a pin having a polygonal head thereon and engaging said holes, said head abutting said first hinge member to prevent axial movement of said pin in a first direction, a first means having a portion adapted to receive said head, said portion having elements therein adapted to cooperate with the polygonal contour of said head to prevent relative rotation between said head and said first means and said first means having a surface substantially normal to the axis of said pin to prevent axial movement thereof in a second direction and said first means including means providing a positive connection between said first means and said first hinge member at a location immediately adjacent said head.

9. A hinge assembly comprising a first hinge member having first and second upturned ears adjacent opposite ends thereof and aligned holes therein and a second hinge member having a hole aligned with the holes in said ears, a hollow cylindrical bearing member located in the hole in said second hinge member, said bearing member having a relatively long bearing surface and being formed of molded and sintered powdered metal having a lubricant content therein, a pin having a polygonal head thereon, said pin penetrating the hollow bearing member and the holes in said ears, said head abutting said first ear to prevent axial movement of said pin in a first direction, a first means adapted to receive said head, said first means having portions thereof adapted to cooperate with the polygonal head of said pin to prevent relative rotation between said head and said first means and said first means having a surface substantially normal to the axis of said pin to prevent axial movement thereof in a second direction, and a second means providing a positive connection between said first means and said first ear whereby relative rotation between said pin and said first hinge member is prevented.

BERNARD STEENSEN.

REFERENCES CITED

The following references are of record in the file of this patent:

UNITED STATES PATENTS

| Number | Name | Date |
| --- | --- | --- |
| 1,175,081 | Petrich | Mar. 14, 1916 |
| 1,562,774 | Kaufmann | Nov. 24, 1925 |
| 1,620,701 | Teich | Mar. 15, 1927 |
| 1,997,147 | Jordan | Apr. 9, 1935 |
| 2,134,397 | Clark | Oct. 25, 1938 |